United States Patent Office 2,809,218
Patented Oct. 8, 1957

2,809,218

TRIFLUOROETHYL ALKYL ACETALS

Louise Speers Croix, Summit, N. J., assignor to Air Reduction Company, Incorporated, New York, N. Y., a corporation of New York No Drawing. Application August 15, 1955,
Serial No. 528,555

3 Claims. (Cl. 260—615)

This invention relates to novel trifluoroethyl alkyl acetals, and, more particularly, to a class of such acetals derived from acetaldehyde, which can be represented by the following formula:

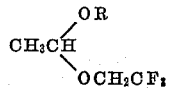

wherein R represents an alkyl group, for example, methyl, ethyl, propyl and butyl In general, the novel unsymmetrical trifluoroethyl alkyl acetals of acetaldehyde are prepared by reacting an alkyl vinyl ether with 2,2,2-trifluoroethanol, in the presence of a strong acid catalyst. The alkyl vinyl ether is selected such that the alkyl group corresponds to the R substituent of the desired acetal; for example, in preparing an acetal of the class herein described in which the R substituent is ethyl, ethyl vinyl ether would be used as a starting material. The reaction results in an addition across the double bond of the ether vinyl group to give the desired acetal, as illustrated by the following equation:

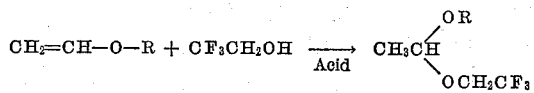

in which R is as defined above. The acid catalyst used, for example, may be p-toluene sulfonic acid, sulfuric acid, or boron trifluoride. The reaction is exothermic and it is preferred to avoid excessive temperatures at which polymerization of the reactants, or of the product, may occur. Generally, temperatures below 45° C. are used.

The following examples serve to illustrate the preparation of the subject compounds:

Example 1

The reaction was carried out in a 300 ml., 3-neck flask equipped with dropping funnel, stirrer, thermometer, and condenser. 0.1 gram of p-toluene sulfonic acid were dissolved in 100 grams of 2,2,2-trifluoroethanol. 75 grams of stabilized vinyl ethyl ether were added dropwise while stirring. An immediate exothermic reaction occurred with clouding of the reaction mixture. The temperature was maintained between 35–45° C. by cooling the flask with an ice bath. After 40 minutes the ether was all added and the reaction mixture was pink in color. Stirring was continued for an additional half hour. The reaction mixture was then poured into 200 ml. of water and neutralized with Na₂CO₃. After standing, the lower organic layer was separated, dried over Na₂CO₃, and filtered. 143 grams of filtrate were fractionally distilled, yielding 78.4 grams of ethyl 2,2,2-trifluoroethyl acetaldehyde acetal. A pure fraction had a boiling point of 104.2–105.0° C. at 751 mm. pressure, and refractive index, $n_D^{20}=1.3477$.

Analysis.—Calc. for $C_6H_{11}F_3O_2$: F=33.13. Found: F=32.68.

Example 2

In a 300 ml., 3-neck flask equipped with a thermometer, stirrer, dropping funnel, and condenser, 0.1 grams of p-toluene sulfonic acid were dissolved in 100 grams of 2,2,2-trifluoroethanol. 100 grams of n-butyl vinyl ether were then added dropwise at a rate of approximately 1 drop per second while stirring. In the first five minutes during which the ether was added, at a temperature of 40° C., the reaction mixture changed to a distinct yellow color. After 10 minutes the color changed to orange and the temperature rose to 43° C. The temperature was then lowered by external cooling and maintained below 35° C. until the completion of the reaction. When all of the ether was added, the mixture, dark brown in color, was poured into 200 cc. of water and neutralized with 1 gram of Na₂CO₃. After extracting twice with ether the resulting extractive was fractionally distilled, yielding 94.5 grams of product. A pure fraction was identified as the butyl 2,2,2-trifluoroethyl acetaldehyde acetal, B. P. 143.2–143.3° C. at 751 mm. pressure; $n_D^{20}=1.3624$.

Analysis.—Calc. for: $C_8H_{15}O_2F_3$: F=28.47. Found: F=27.96.

The new compounds are useful as solvents, for example, for dissolving acetylene and similar organic substances, and as intermediates. As intermediates, they may be used, for example, in the preparation of 2,2,2-trifluoroethyl vinyl ether. This ether is a useful monomer from which relatively high molecular weight, form-stable, non-tacky, polymers may be obtained, as described in the application, Serial No. 409,057, of C. E. Schildknecht; and, when in suitably pure form, also is useful as a general inhalation anesthetic, as described in application, Serial No. 357,901, of J. G. Shukys. Both of the above applications are assigned to the assignee of the present application. The novel acetals herein described may be converted to 2,2,2-trifluoroethyl vinyl ether by treating them at temperatures of from 40–50° C., with small amounts of an acid such as p-toluene sulfonic acid; or, by heating, in the vaporous state, at temperatures of from 200–400° C. in the presence of a suitable catalyst, such as pumice.

I claim:

1. The unsymmetrical trifluoroethyl alkyl acetals of acetaldehyde represented by the formula

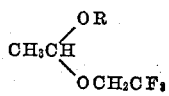

wherein R is a lower alkyl group.

2. The compound having the formula

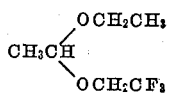

3. The compound having the formula

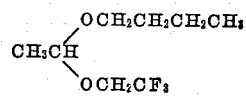

References Cited in the file of this patent
UNITED STATES PATENTS

| | | |
|---|---|---|
| 2,374,078 | Coffman | Apr. 17, 1945 |
| 2,433,844 | Hanford | Jan. 6, 1948 |
| 2,732,370 | Codding | Jan. 24, 1956 |